United States Patent
Iwanaga et al.

(10) Patent No.: US 7,358,696 B2
(45) Date of Patent: Apr. 15, 2008

(54) METHOD AND APPARATUS FOR PWM DRIVE

(75) Inventors: Ayako Iwanaga, Kyoto (JP); Tomokazu Furuno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/504,037

(22) Filed: Aug. 15, 2006

(65) Prior Publication Data

US 2007/0053670 A1  Mar. 8, 2007

(30) Foreign Application Priority Data

Sep. 2, 2005  (JP) ............................ 2005-254226

(51) Int. Cl.
*H02P 7/29* (2006.01)
(52) U.S. Cl. ...................... 318/293; 318/287; 318/291; 318/379
(58) Field of Classification Search ........ 318/280–283, 318/287, 291, 293, 294, 375–379
See application file for complete search history.

(56) References Cited

U.S. PATENT DOCUMENTS

| | | | | | |
|---|---|---|---|---|---|
| 4,562,386 | A | * | 12/1985 | Goff et al. ................... | 318/254 |
| 5,379,209 | A | * | 1/1995 | Goff ........................... | 363/132 |
| 5,428,522 | A | * | 6/1995 | Millner et al. ................ | 363/63 |
| 5,532,562 | A | * | 7/1996 | Yasuda ....................... | 318/439 |
| 5,708,578 | A | * | 1/1998 | Stoddard et al. ............. | 363/98 |
| 5,801,504 | A | * | 9/1998 | Endo et al. .................. | 318/434 |
| 5,874,847 | A | * | 2/1999 | Kim et al. ................... | 327/390 |
| 6,995,531 | B2 | * | 2/2006 | Ichimaru et al. ............ | 318/254 |

FOREIGN PATENT DOCUMENTS

| JP | 3-288901 | 12/1991 |
|---|---|---|
| JP | 7-117841 | 12/1995 |

* cited by examiner

*Primary Examiner*—Bentsu Ro
(74) *Attorney, Agent, or Firm*—Steptoe & Johnson LLP

(57) ABSTRACT

During PWM control in which an actuator (9) is connected between the output terminals of a bridge circuit made up of switching elements (121, 122, 221, 222) and power is applied to the actuator (9) with signals G1U, G1L, G2U and G2L, driving timing signals are generated with a time interval (dead time) during which the switching elements (121, 122) and the switching elements (221, 222) are simultaneously turned off, and the actuator (9) is driven so as to have no overlapping dead time between a pair of half-bridge circuits, achieving response even with a differential input PWM signal (S51-S52) having a small time difference.

5 Claims, 10 Drawing Sheets

US 7,358,696 B2

METHOD AND APPARATUS FOR PWM DRIVE

FIELD OF THE INVENTION

The present invention relates to an apparatus for pulse-width modulation (PWM) motor drive for driving a load such as an actuator.

BACKGROUND OF THE INVENTION

Optical recording/reproducing apparatuses require tracking control and focus control with fine light spots on recording media. Actuators, to be specific, linear motors are used for tracking control and focus control. In response to the need for low power consumption in recent years, methods for PWM motor drive achieving high power efficiency have been used for tracking control and focus control.

FIG. 6 shows a conventional apparatus for PWM motor drive.

An actuator 9 is connected between the output of a first output unit 7 and the output of a second output unit 8. The first output unit 7 is made up of a first timing pulse generating section 71 and a first output stage 12. The second output unit 8 is made up of a second timing pulse generating section 81 and a second output stage 22. The first output unit 7 and the second output unit 8 are driven based on a differential input PWM signal from a PWM signal generating section 6. FIG. 7 is a waveform chart showing the inputs/outputs of the parts of FIG. 6.

The PWM signal generating section 6 determines a pulse width according to the level of an analog input signal S50 and generates a differential input PWM signal made up of a first pulse-width modulation (PWM) signal S51 and a second pulse-width modulation (PWM) signal S52.

The first output unit 7 outputs a first output signal S53 in response to the first PWM signal S51. The second output unit 8 outputs a second output signal S54 in response to the second PWM signal S52.

The actuator 9 is driven by the differential component (S53-S54) of the two-phase pulse output signals outputted from the first output unit 7 and the second output unit 8. Also when driving output applied across the actuator 9 is set at zero (hereinafter, will be referred to as zero output), PWM operations are performed by the first PWM signal S51 and the second PWM signal S52.

In other words, when the differential input PWM signal has zero output, the first PWM signal S51 and the second PWM signal S52 are in phase with an equal pulse width.

In the case of output to the actuator 9 in one direction on the average, the "H" level period of the first PWM signal S51 is increased and the "L" level period of the second PWM signal S52 is increased.

In the case of output to the actuator 9 in the other direction on the average, the "L" level period of the first PWM signal S51 is increased and the "H" level period of the second PWM signal S52 is increased.

In other words, in the case of output other than zero output, while the pulse width of the first PWM signal S51 is increased (or reduced), the pulse width of the second PWM signal S52 is reduced (or increased).

To be specific, when the first output signal S53 outputted from the first output unit 7 and the second output signal S54 outputted from the second output unit 8 are in phase with an equal pulse width as indicated on time A of FIG. 7, the actuator 9 is not driven (zero output). In the case of a large difference in duty ratio as indicated on times B and C of FIG. 7, the actuator 9 is driven by a large signal biased in either of the directions.

FIG. 8 shows the specific circuit configurations of the first and second output units 7 and 8.

The first timing pulse generating section 71 of the first output unit 7 is made up of a delay circuit 72, a NAND gate 73, and a NOR gate 74. The first output stage 12 is made up of a pair of transistors 121 and 122. The transistor 121 is a P-type FET and the transistor 122 is an N-type FET.

The second timing pulse generating section 81 of the second output unit 8 is made up of a delay circuit 82, a NAND gate 83, and a NOR gate 84. The second output stage 22 is made up of a pair of transistors 221 and 222.

In the first and second output stages 12 and 22, the sources of the transistors 121 and 221 are connected to one pole 3 of a power supply and the sources of the transistors 122 and 222 are connected to ground 5 which is the other pole of the power supply, so that a bridge circuit is formed. The actuator 9 is connected between a node 31 of the drain of the transistor 121 and the drain of the transistor 122 and a node 32 of the drain of the transistor 221 and the drain of the transistor 222. The series circuit of the transistors 121 and 122 and the series circuit of the transistors 221 and 222 are each called a half-bridge circuit.

The first and second output units 7 and 8 are identical in circuit configuration and the actuator 9 is driven by the differential component (S53-S54) of the two pulses, so that even when the output pulses of the first output unit 7 and the second output unit 8 mostly cancel each other out, a load is driven by a differential output which is operated according to a level difference and a time difference between the output pulses of the first output unit 7 and the second output unit 8. FIG. 9 shows an output current effective value relative to a time difference between the first PWM signal S51 and the second PWM signal S52. As the time difference comes close to zero, a dead zone appears with no response of the output current effective value. The horizontal axis of FIG. 9 represents a time difference between the first PWM signal S51 and the second PWM signal S52 and the vertical axis of FIG. 9 represents an output current effective value.

Such a conventional configuration is disclosed in Japanese Patent Publication No. 7-117841.

DISCLOSURE OF THE INVENTION

Generally, when simultaneously switching a pair of transistors (for example, 121 and 122) making up one side (half-bridge circuit) of a bridge circuit including the first and second output stages 12 and 22, both of the transistors are turned on for a certain time interval during switching transition, so that flow-through current passes between the power supply and the ground 5, causing a break or degradation of the transistors. In order to prevent this problem, the first timing pulse generating sections 71 and 81 generally have a time interval during which the two transistors 121 and 122 and the two transistors 221 and 222 are simultaneously turned off (hereinafter, will be referred to as a dead time).

The generation of a dead time in the conventional example is illustrated in FIG. 10 which is a timing chart of FIG. 8. In the first timing pulse generating section 71, a gate signal G1U is obtained by delaying the first PWM signal S51 only when the transistor 121 is turned on and a gate signal G1L is obtained by delaying the first PWM signal S51 only when the transistor 122 is turned on. The gate signals G1U and G1L are generated as follows:

A signal S71 is generated from the first PWM signal S51 through the delay circuit 72, and the gate signal G1U is supplied from the output of the NAND gate 73 which is fed with the first PWM signal S51 and the signal S71 as input signals. The gate signal G1L is supplied from the output of the NOR gate 74 which is fed with the first PWM signal S51 and the signal S71 as input signals.

In the second timing pulse generating section 81, a gate signal G2U and a gate signal G2L are similarly generated by the delay circuit 82, the NAND gate 83, and the NOR gate 84. The gate signal G2U is obtained by delaying the second PWM signal S52 only when the transistor 221 is turned on, and the gate signal G2L is obtained by delaying the second PWM signal S52 only when the transistor 222 is turned on.

In this way, a dead time is provided during which the pairs of transistors 121 and 122 and 221 and 222 making up the half-bridge circuits of the first and second output stages 12 and 22 are turned off, so that it is possible to prevent large current from passing between the power supply and the ground.

In FIG. 10, in time intervals W10 and W20 of the gate signals G1U and G1L supplied to the pair of transistors 121 and 122 from the first timing pulse generating section 71, the pair of transistors 121 and 122 are both turned off. Further, in time intervals W30 and W40 of the gate signals G2U and G2L supplied to the pair of transistors 221 and 222 from the second timing pulse generating section 81, the pair of transistors 221 and 222 are both turned off.

The through rate of the output pulse is not infinite and generally the maximum slew rate is set to reduce the occurrence of spike noise. The dead time has to be set as a period in consideration of the slew rate.

If the resolution of the PWM signal generating section 6 is improved, a change time equivalent to 1 LSB becomes shorter than the dead time. A signal equivalent to 1 LSB is supplied as a time difference between the first PWM signal S51 and the second PWM signal S52. When the first and second PWM signals S51 and S52 are inputted which cause a time difference smaller than the dead time, the transistor 122 is turned off at the falling edge of the gate signal G1L during rise time, and then the transistor 121 is turned on at the falling edge of the gate signal G1U. When output terminal 31 is set at a high level, an output terminal 32 has a high impedance because the transistors 221 and 222 are both turned off, so that the actuator 9 cannot be driven.

In other words, when the transistor 121 is turned on at time t1 of FIG. 10, although fundamentally the transistor 221 has to be turned off and the transistor 222 has to be turned on, such a state is completed before time t2. Similarly, prior to time t3 when the transistor 121 is turned off from a state in which the transistor 121 is turned on and the transistor 122 is turned off, the transistor 221 has to be turned off and the transistor 222 has to be turned on. Such a state does not occur until time t4. In FIG. 10, the transistors 121 and 122 are both turned off at time t4 and fine output of about 1 LSB does not occur and becomes zero. When the input/output characteristics are expressed with the horizontal axis representing a time difference between the first and second PWM signals S51 and S52 and the vertical axis representing an effective value of load current, a dead zone still remains as shown in FIG. 9.

Although the dead zone is smaller than that of "Background of the Invention", the dead zone causes a serious problem when fine linearity is demanded.

Although Japanese Patent Publication No. 7-117841 discloses the basics of pulse combination method for the first and second timing pulse generating section 71 and 72 but does not disclose that crossover distortion is removed in consideration of the dead time of the output units 7 and 8.

It is an object of the present invention, in view of the problem, to provide a practical method and apparatus for PWM drive which can remove a dead zone (crossover distortion) of responsiveness of an output pulse relative to a differential input PWM signal.

A method for PWM motor drive according to claim 1, wherein during PWM control in which a load is connected to the output terminals of a bridge circuit, a pair of half-bridge circuits making up the bridge circuit is switched so as to apply power to the load only when output signals are in opposite phase with a two-phase voltage pulse, and a control target is brought to a target condition, the pair of half-bridge circuits is operated with a dead time during which two switching elements making up the half-bridge circuit in series connection are both turned off, and the load is driven so as to have no overlapping dead time between the pair of half-bridge circuits.

An apparatus for PWM drive according to claim 2 of the present invention, comprises: a PWM signal generating section for generating first and second PWM signals each having a pulse width determined by an analog input signal; a bridge circuit made up of first and second output stages each including two switching elements connected in series, the bridge circuit including a load connected between the output terminals of the output stages; a first advanced edge decision section for deciding whether the first or second PWM signal is switched first and outputting a first advanced edge decision signal; a first timing pulse generating section which is fed with the first PWM signal and the first advanced edge decision signal as input signals, has a dead time during which the switching elements making up in series connection the first output stage are simultaneously turned off, and generates first and second driving timing signals causing no overlapping dead time between the first and second output stages; a second advanced edge decision section for deciding whether the first or second PWM signal is switched first and outputting a second advanced edge decision signal; and a second timing pulse generating section which is fed with the second PWM signal and the second advanced edge decision signal as input signals, has a dead time during which the switching elements making up in series connection the second output stage are simultaneously turned off, and generates third and fourth driving timing signals causing no overlapping dead time between the first and second output stages.

An apparatus for PWM drive according to claim 3 of the present invention is such that in claim 2, the first timing pulse generating section comprises: a first delay pattern generating section for generating a plurality of delay signals obtained by delaying the first PWM signal by different predetermined times, a combination of the delay signals, and PWM signals inverted from the delay signals; and a first selector which selects, based on the first advanced edge decision signal, one of the plurality of PWM signals outputted from the first delay pattern generating section and outputs the selected signal as the driving timing signal to the one of the output stages, and the second timing pulse generating section comprises: a second delay pattern generating section for generating a plurality of delay signals obtained by delaying the second PWM signal by different predetermined times, a combination of the delay signals, and the inverted signals of the delay signals; and a second selector which selects, based on the second advanced edge decision signal, one of the plurality of PWM signals outputted from the second delay pattern generating section and outputs the selected signal as the driving timing signal to the other output stage.

An apparatus for PWM drive according to claim 4 of the present invention is such that in claim 3, the first delay pattern generating section comprises: a first delay circuit for outputting the first delay signal obtained by delaying the first PWM signal; a second delay circuit for outputting the second delay signal obtained by delaying the first delay signal; a first inverter for outputting the signals inverted from the first delay signal; a first NAND gate having an input connected to the first PWM signal and the second delay signal; and a first NOR gate having an input connected to the first PWM signal and the second delay signal, the first selector comprises: a first selector circuit which selects one of the output signal of the first inverter and the output signal of the first NAND gate based on the first advanced edge decision signal and outputs the driving timing signal to the gate of one of the two switching elements making up the half-bridge circuit acting as the first output stage; and a second selector circuit which selects one of the output signal of the first inverter and the output signal of the first NOR gate based on the first advanced edge decision signal and outputs the driving timing signal to the gate of the other switching element making up the half-bridge circuit acting as the first output stage, the second delay pattern generating section comprises: a third delay circuit for outputting the third delay signal obtained by delaying the second PWM signal; a fourth delay circuit for outputting the fourth delay signal obtained by delaying the third delay signal; a second inverter for outputting the signals inverted from the third delay signal; a second NAND gate having an input connected to the second PWM signal and the fourth delay signal; and a second NOR gate having an input connected to the second PWM signal and the fourth delay signal, the second selector comprises: a third selector circuit which selects one of the output signal of the second inverter and the output signal of the second NAND gate based on the second advanced edge decision signal and outputs the driving timing signal to the gate of one of the two switching elements making up the half-bridge circuit acting as the second output stage; and a fourth selector circuit which selects one of the output signal of the second inverter and the output signal of the second NOR gate based on the second advanced edge decision signal and outputs the driving timing signal to the gate of the other switching element making up the half-bridge circuit acting as the second output stage.

An apparatus for PWM drive according to claim 5 of the present invention is such that in claim 2, the load is an actuator.

With this configuration, even in the case of an extremely small time difference between the differential input PWM signals, the differential pulses outputted from the two output terminals of the output stages can be outputted faithfully to the differential input PWM signals, so that a dead zone can be eliminated and driving even minute outputs can be achieved with high accuracy.

DESCRIPTION OF THE EMBODIMENTS

Figure 1:
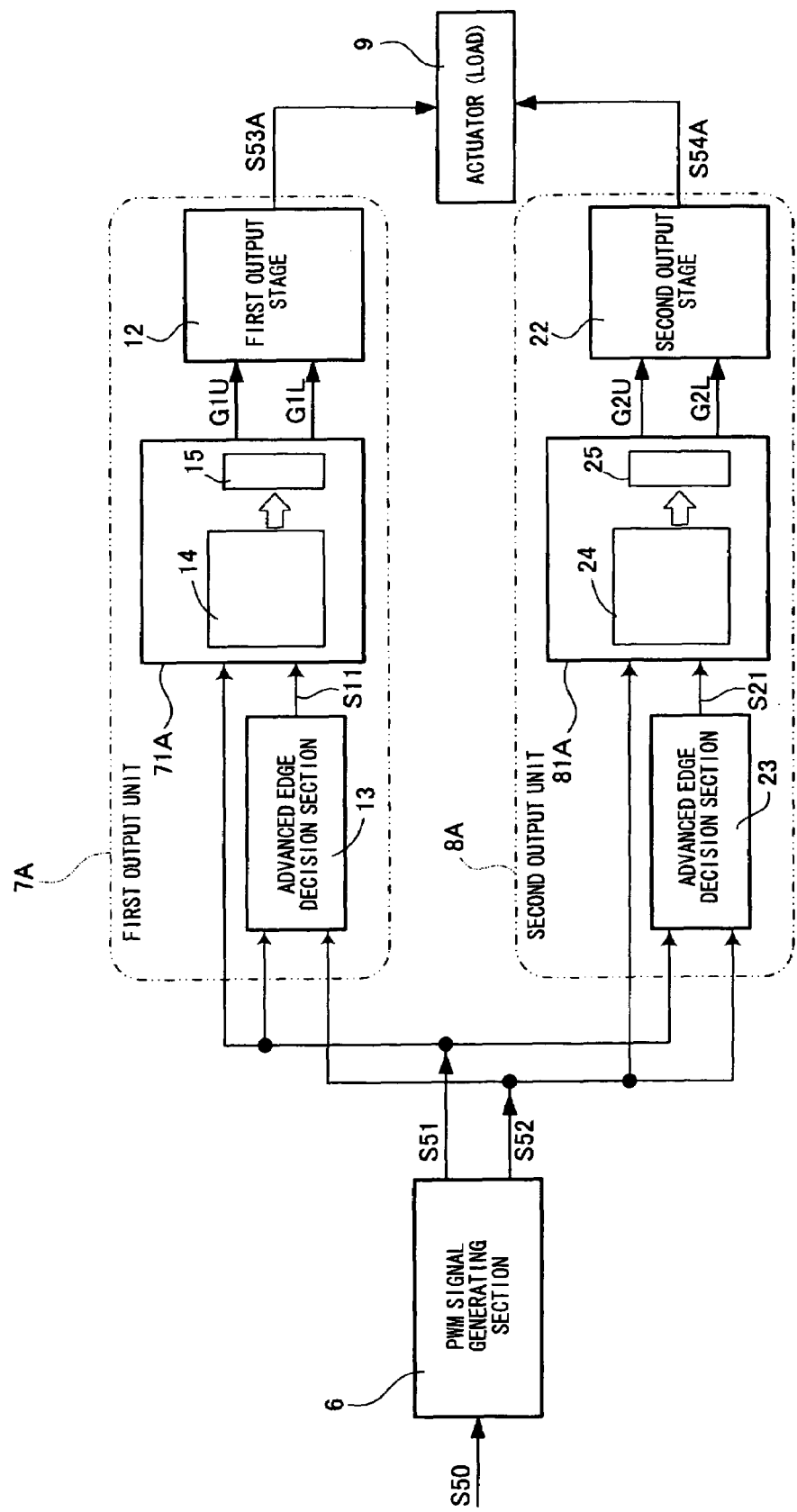
FIG. 1 is a structural diagram showing the main part of an apparatus for PWM drive according to (Embodiment 1) for implementing a method for PWM motor drive of the present invention.

A method for PWM motor drive of the present invention will be discussed below in accordance with specific embodiments. Constituent elements having the same operations as the conventional example are indicated by the same reference numerals.

Embodiment 1

FIGS. 1 to 5 show (Embodiment 1) of the present invention.

Figure 2:
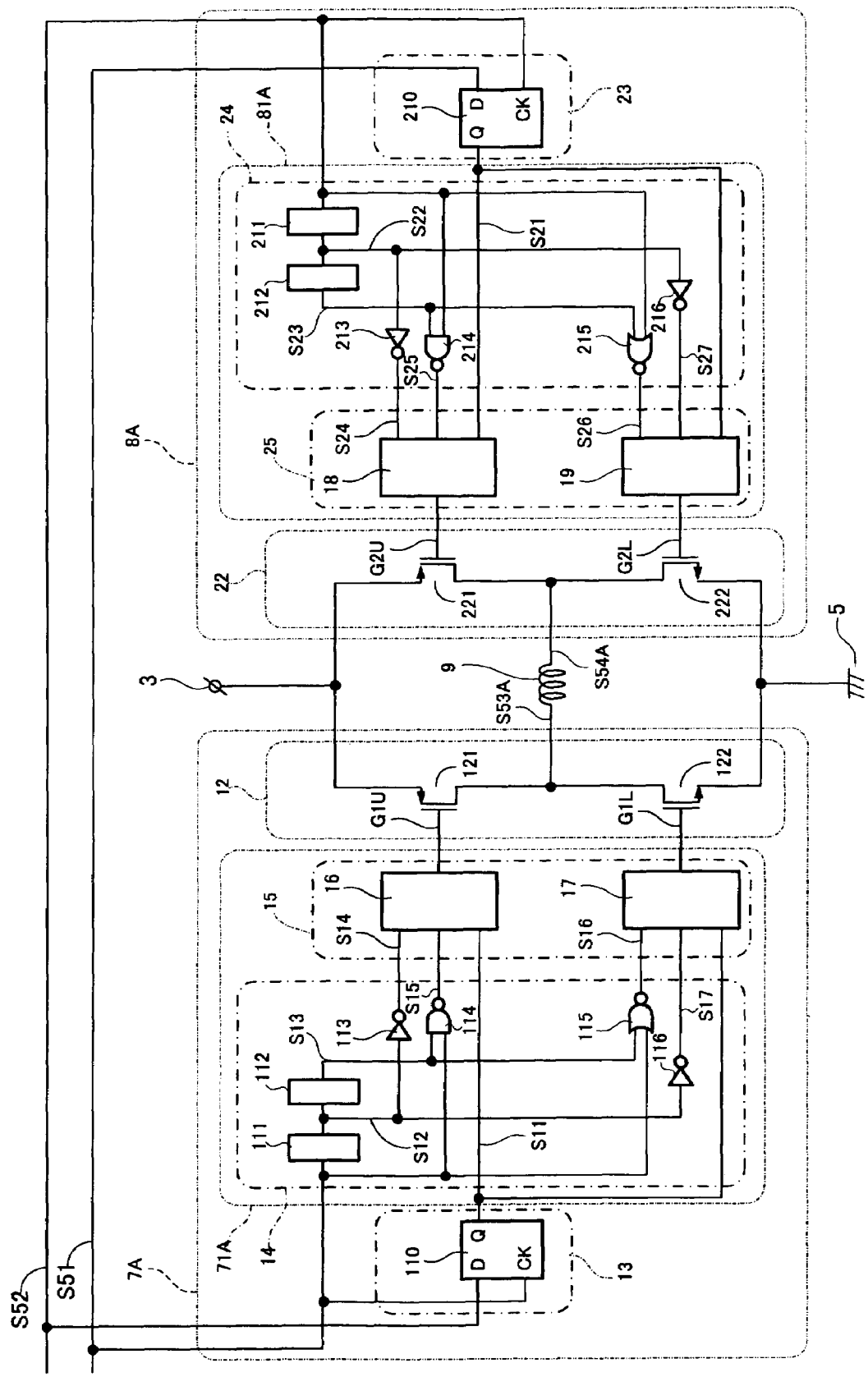
FIG. 2 is a circuit diagram of (Embodiment 1)
Figure 6:
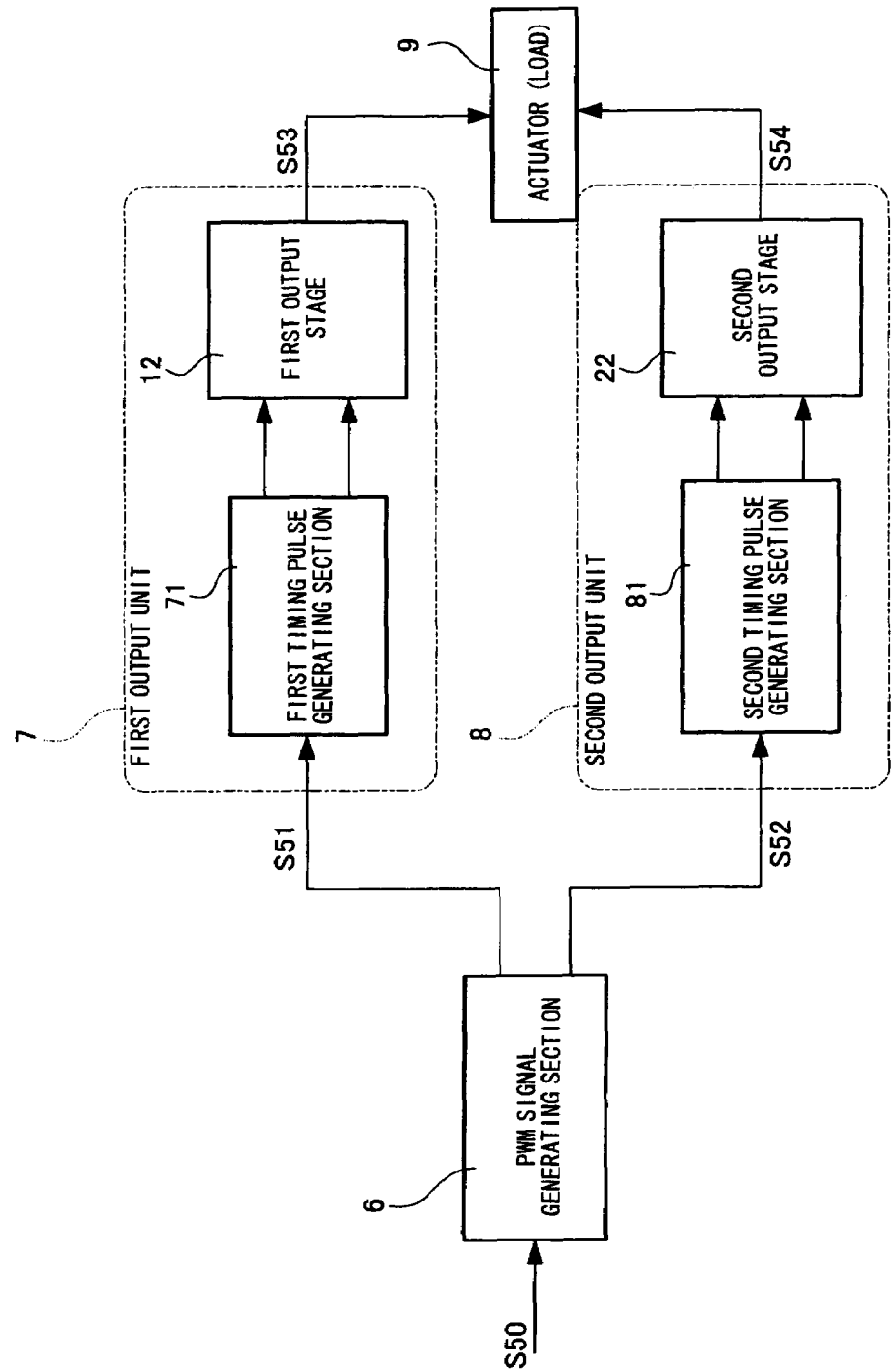
FIG. 6 is a structural diagram showing a conventional apparatus for PWM drive.

FIG. 1 shows an apparatus for PWM drive of the present invention. The specific configurations of the first and second output units 7 and 8 of the conventional example shown in FIG. 6 are different in FIG. 1. FIG. 2 shows the detail of the configuration of the apparatus for PWM drive.

Figure 3:
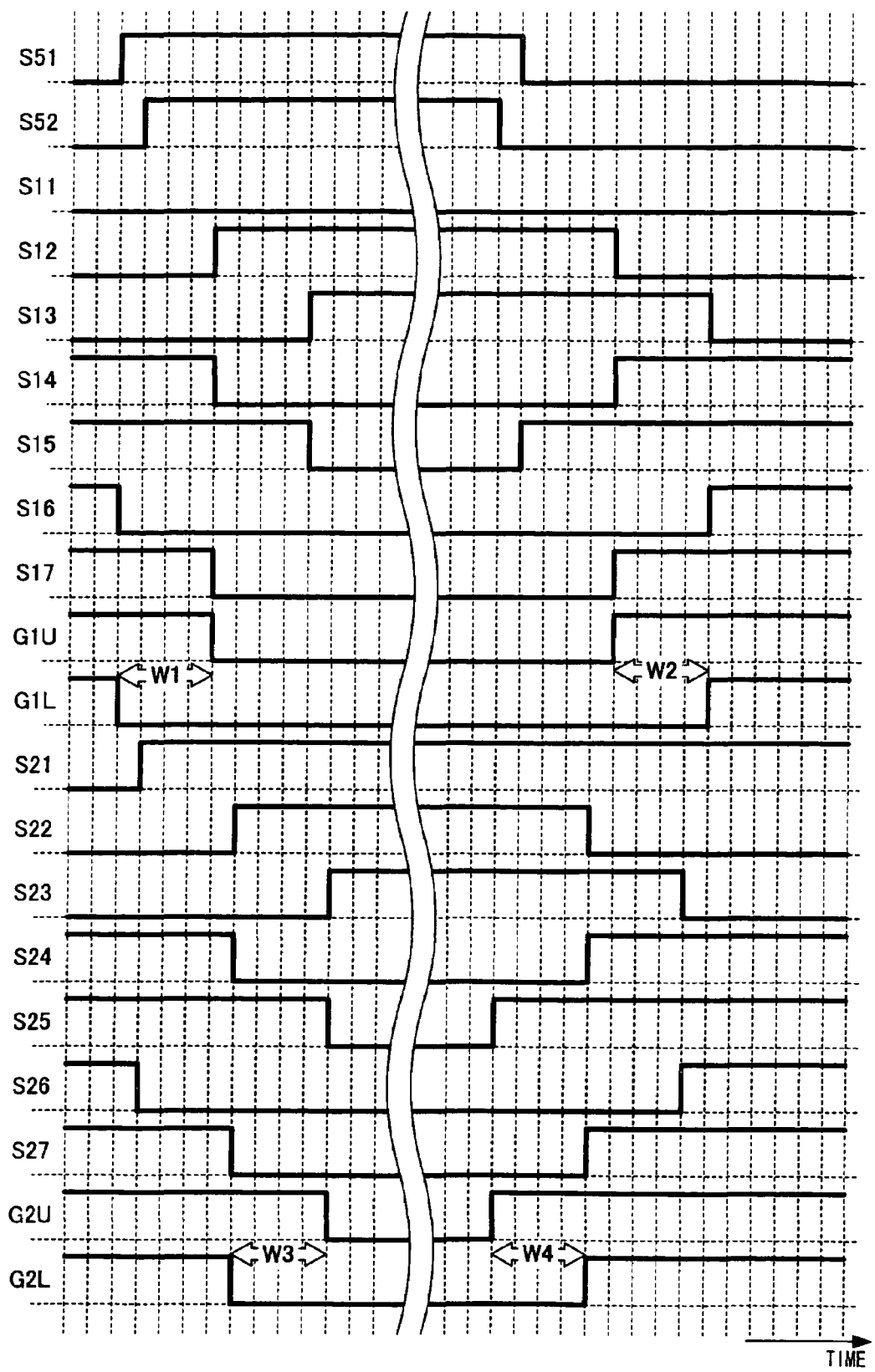
FIG. 3 is a timing chart of (Embodiment 1)

Both ends of an actuator 9 are connected between the output of a first output unit 7A and the output of a second output unit 8A. The first output unit 7A is made up of an advanced edge decision section 13, a first timing pulse generating section 71A, and a first output stage 12. The second output unit 8A is made up of an advanced edge decision section 23, a second timing pulse generating section 81A, and a second output stage 22. The first output unit 7A and the second output unit 8A are driven based on signals from a PWM signal generating section 6. The PWM signal generating section 6 outputs a first PWM signal S51 and a second PWM signal S52, which are shown in FIG. 3, according to the level of an analog input signal S50.

The advanced edge decision section 13 of the first output unit 7A detects, when the first PWM signal S51 is switched (for example, from "L" level to "H" level), the signal level of the second PWM signal S52, decides whether the first PWM signal S51 is switched before or after the second PWM signal S52, and outputs an advanced edge decision signal S11. The advanced edge decision section 13 includes a flip-flop 110 in which the second PWM signal S52 is supplied to data input (D), and the first PWM signal S51 is supplied to clock input (CK). The advanced edge decision section 13 decides the level of the second PWM signal S52 at the rising edge of the first PWM signal S51 and outputs the advanced edge decision signal S11 from output (Q). When the second PWM signal S52 has already risen at the rising edge of the first PWM signal S51, the advanced edge decision section 13 outputs the advanced edge decision signal S11 of "H" level. When the second PWM signal S52 has not risen yet, the advanced edge decision section 13 outputs the advanced edge decision signal S11 of "L" level from the output (Q).

The first timing pulse generating section 71A is made up of a delay pattern generating section 14 and a selector 15 and is fed with the first PWM signal S51 and the advanced edge decision signal S11 as input signals. The delay pattern generating section 14 delays the first PWM signal S51 by predetermined times to generate a plurality of signals with different delay amounts, and the selector 15 selects the signal with a proper delay amount according to the level of the advanced edge decision signal S11, so that a gate signal G1U as a first output stage driving signal and a gate signal G1L as a second output stage driving signal are outputted to the first output stage 12. Simultaneously according to the level of the advanced edge decision signal S11, operations are switched between a direction that advances, relative to one of the output stage driving signals, the edge timing of the other output stage driving signal and a direction that delays the edge timing, so that the edge timing is delayed in the direction opposite to the delay direction of the second timing pulse generating section 81A (will be described later) to prevent the dead times (simultaneous turn-off time intervals) of the first output stage 12 and the second output stage 22 from overlapping each other.

The delay pattern generating section 14 is made up of a first delay circuit 111 which outputs a delay signal S12 obtained by delaying the inputted first PWM signal S51 by a first predetermined time, a second delay circuit 112 which outputs a delay signal S13 obtained by delaying the delay signal S12 by a second predetermined time, inverters 113 and 116 which output reference signals S14 and S17 inverted from the delay signal S12, a NAND gate 114 which has an input connected to the first PWM signal S51 and the delay signal S13 and outputs a first composite signal S15, and a NOR gate 115 which has an input connected to the first PWM signal S51 and the delay signal S13 and outputs a second composite signal S16. Relative to the reference signals S14 and S17 outputted by the inverters 113 and 116, the NAND gate 114 generates the first composite signal S15 which falls after a reference signal S14 and rises before the reference signal S14. The NOR gate 115 generates the second composite signal S16 which falls before the reference signal S14 and rises after the reference signal S14.

The selector 15 is made up of a selector circuit 16 which selects one of the reference signal S14 and the first composite signal S15 according to the level of the advanced edge decision signal S11 and outputs the gate signal G1U, and a selector circuit 17 which selects one of the second composite signal S16 and the reference signal S17 according to the level of the advanced edge decision signal S11 and outputs the gate signal G1L. To be specific, when the advanced edge decision signal S11 is set at "L" level, the selector circuit 16 outputs the reference signal S14 as the gate signal G1U. When the advanced edge decision signal S11 is set at "H" level, the selector circuit 16 outputs the first composite signal S15 as the gate signal G1U. When the advanced edge decision signal S11 is set at "L" level, the selector circuit 17 outputs the second composite signal S16 as the gate signal G1L. When the advanced edge decision signal S11 is set at "H" level, the selector circuit 16 outputs the reference signal S17 as the gate signal G1L. Transistors 121 and 122 making up the first output stage 12 are driven in response to the gate signals G1U and G1L.

The second output unit 8A is identical in circuit configuration to the first output unit 7A. The advanced edge decision section 23 of the second output unit 8A detects, when the second PWM signal S52 is switched (for example, from "L" level to "H" level), the signal level of the first PWM signal S51, decides whether the second PWM signal S52 is switched before or after the first PWM signal S51, and outputs an advanced edge decision signal S21. The advanced edge decision section 23 includes a flip-flop 210 in which the first PWM signal S51 is supplied to data input (D), the second PWM signal S52 is supplied to clock input (CK), and the advanced edge decision signal S21 is outputted from output (Q). Therefore, the flip-flop 210 making up the advanced edge decision section 23 operates in opposite phase from a flip-flop 110 in most cases, and the flip-flop 210 outputs "H" level when the advanced edge decision section 13 outputs "L" level.

The second timing pulse generating section 81A is fed with the second PWM signal S52 and the advanced edge decision signal S21 as input signals and switches the delay direction of the second PWM signal S52 such that the dead times of the first output stage 12 and the second output stage 22 do not overlap each other, and the second timing pulse generating section 81A outputs the gate signal G2U as a third output stage driving signal and the gate signal G2L as a fourth output stage driving signal to the second output stage 22.

The second timing pulse generating section 81A is made up of a delay pattern generating section 24 and a selector 25.

The delay pattern generating section 24 is made up of a third delay circuit 211 which outputs a delay signal S22 obtained by delaying the inputted second PWM signal S52 by a third predetermined time, a fourth delay circuit 212 which outputs a delay signal S23 obtained by delaying the delay signal S22 by a fourth predetermined time, inverters 213 and 216 which output reference signals S24 and S27 inverted from the signal S22, a NAND gate 214 having an input connected to the second PWM signal S52 and the delay signal S23 and outputs a third composite signal S25, and a NOR gate 215 having an input connected to the second PWM signal S52 and the delay signal S23 and outputs a fourth composite signal S26. Relative to the reference signals S24 and S27 outputted by the inverters 213 and 216, the NAND gate 114 generates the third composite signal S25 which falls after the reference signal S24 and rises before the reference signal S24. The NOR gate 215 generates the fourth composite signal S26 which falls before the reference signal S24 and rises after the reference signal S24.

The selector 25 is made up of a selector circuit 18 which selects one of the reference signal S24 and the third composite signal S25 according to the level of the advanced edge decision signal S21 and outputs the gate signal G2U, and a selector circuit 19 which selects one of the fourth composite signal S26 and the reference signal S27 according to the level of the advanced edge decision signal S21 and outputs the gate signal G2L. To be specific, when the advanced edge decision signal S21 is set at "L" level, the selector circuit 18 outputs the reference signal S24 as the gate signal G2U. When the advanced edge decision signal S21 is set at "H" level, the selector circuit 18 outputs the third composite signal S25 as the gate signal G2U. When the advanced edge decision signal S21 is set at "L" level, the selector circuit 19 outputs the fourth composite signal S26 as the gate signal G2L. When the advanced edge decision signal S21 is set at "H" level, the selector circuit 19 outputs the reference signal S27 as the gate signal G2L. Transistors 221 and 222 making up the first output stage 12 are driven in response to the gate signals G2U and G2L.

According to the method for PWM motor drive, when one of the PWM signals rises, the inputted one PWM signal is delayed at the detection of the other PWM signal at "H" level. Thus the driving timing signal can be generated such that the dead time of the first output stage and the dead time of the second output stage 22 do not overlap each other. It is thus possible to positively obtain an overlap of a period during which one of the output terminals is set at H (or L)

and a period during which the other output terminal is set at L (or H). Therefore, even when a time difference between the differential input PWM signals is shorter than the dead time, a differential pulse precisely reflecting the time difference between the differential input PWM signals can be outputted as a PWM signal, minimizing a dead zone. In this way, even when the differential input PWM signals are inputted with a smaller time difference than the dead time, the output pulse can precisely respond to the time difference between the differential input PWM signals.

Figure 4:
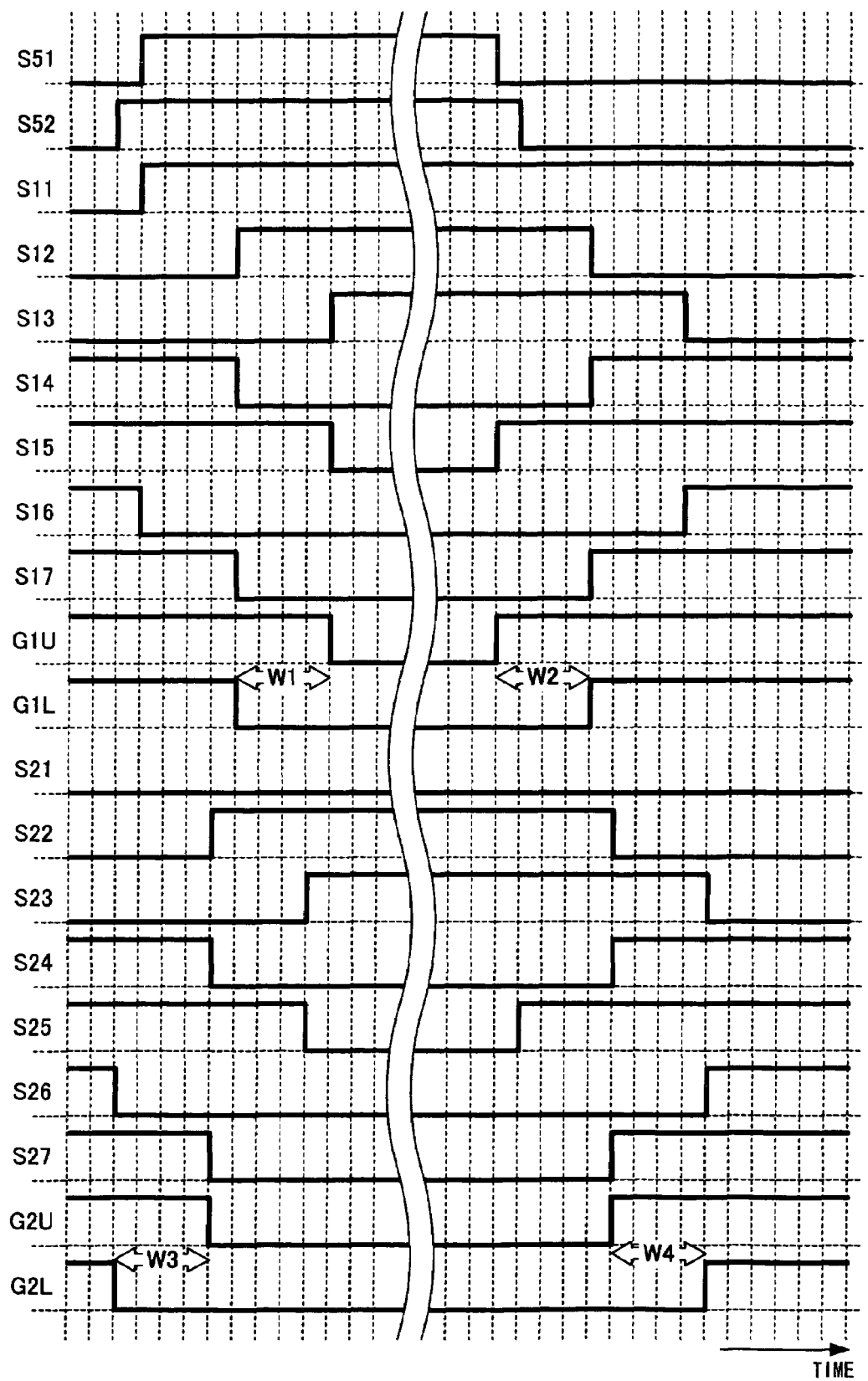
FIG. 4 is a timing chart of (Embodiment 1)

FIGS. 3 and 4 show the signal timing of the sections of the first and second output units 7A and 8A configured thus. In time intervals W1 and W2 of the gate signals G1U and G1L supplied to the pair of transistors 121 and 122 from the first timing pulse generating section 71A, the pair of transistors 121 and 122 are both turned off. Further, in time intervals W3 and W4 of the gate signals G2U and G2L supplied to the pair of transistors 221 and 222 from the second timing pulse generating section 81A, the pair of transistors 221 and 222 are both turned off.

In FIG. 3, since the second PWM signal S52 has not risen at the rising edge of the first PWM signal S51, the advanced edge decision signal S11 outputted from the flip-flop 110 does not change and is kept at "L" level. Since the advanced edge decision signal S11 is set at "L" level, the selector circuit 16 outputs the signal S14 as the gate signal G1U to the gate of the transistor 121, and the selector circuit 17 outputs the signal S16 as the gate signal G1L to the gate of the transistor 122.

However, since the first PWM signal S51 has already risen at the rising edge of the second PWM signal S52, the advanced edge decision signal S21 outputted from the flip-flop 210 rises at the rising edge of the second PWM signal S52 and is set at "H" level. Thus the rise of the first PWM signal S51 is transmitted to the selector circuits 18 and 19. Accordingly, the selector circuit 18 outputs the signal S25 to the gate signal G2U and the selector circuit 19 outputs the signal S27 to the gate signal G2L.

The detail will be discussed below.

For example, when the advanced edge decision section 13 of the first output unit 7A detects the signal level of the second PWM signal S52 at the rising edge of the first PWM signal S51, in the case where the rising edge of the second PWM signal S52 comes behind the first PWM signal S51, the advanced edge decision signal S11 of "L" level is outputted from the advanced edge decision section 13 as shown in FIG. 3, and the advanced edge decision section 23 of the second output unit 8A outputs "H" level from the rising edge of the second PWM signal S52. Thus the selector circuit 16 selects the reference signal S14 and applies the reference signal S14 as the gate signal G1U to the gate of the transistor 121. On the other hand, the selector circuit 19 selects the reference signal S27 and applies the reference signal S27 as the gate signal G2L to the gate of the transistor 222. Therefore when the delay time of the first delay circuit 111 and the delay time of the third delay circuit 211 are equal to each other, the transistor 121 and the transistor 222 can be simultaneously brought into conduction. Thus even in the case of the differential input PWM signal (S51-S52) with a small time difference between the first PWM signal S51 and the second PWM signal S52, the actuator (load) 9 can be sufficiently driven. Hence, it is possible to minimize a dead zone having the property of driving a load in response to the differential input PWM signal, minimizing crossover distortion.

It is desirable that the delay time of the first delay circuit 111 and the delay time of the third delay circuit 211 be equal to each other. However, as long as the delay times are substantially equal to each other, the first delay circuit 111 and the third delay circuit 211 may have different delay times within a range acceptable to a design specification required for the apparatus for motor drive.

Figure 7:
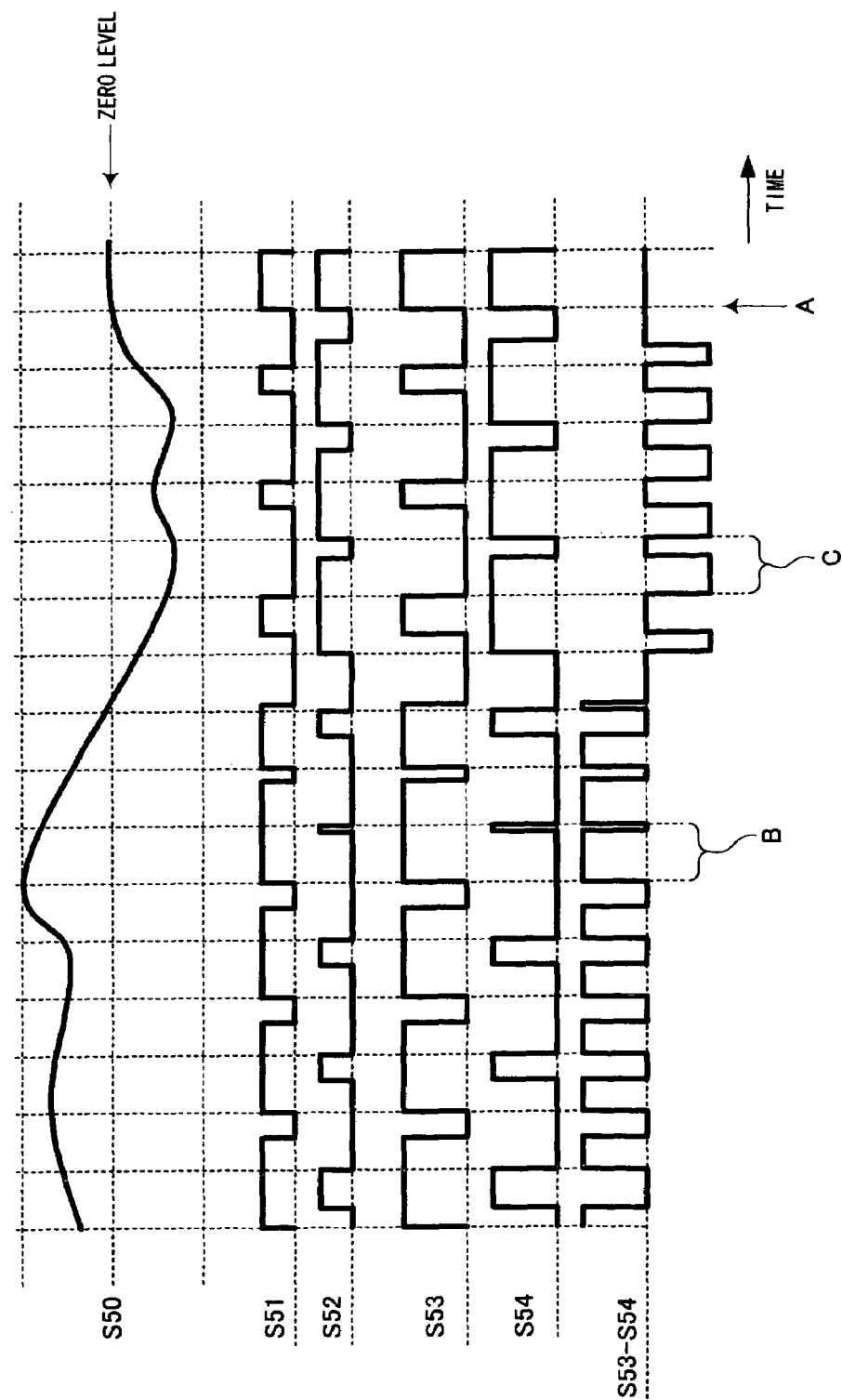
FIG. 7 is a timing chart of a conventional example.
Figure 8:
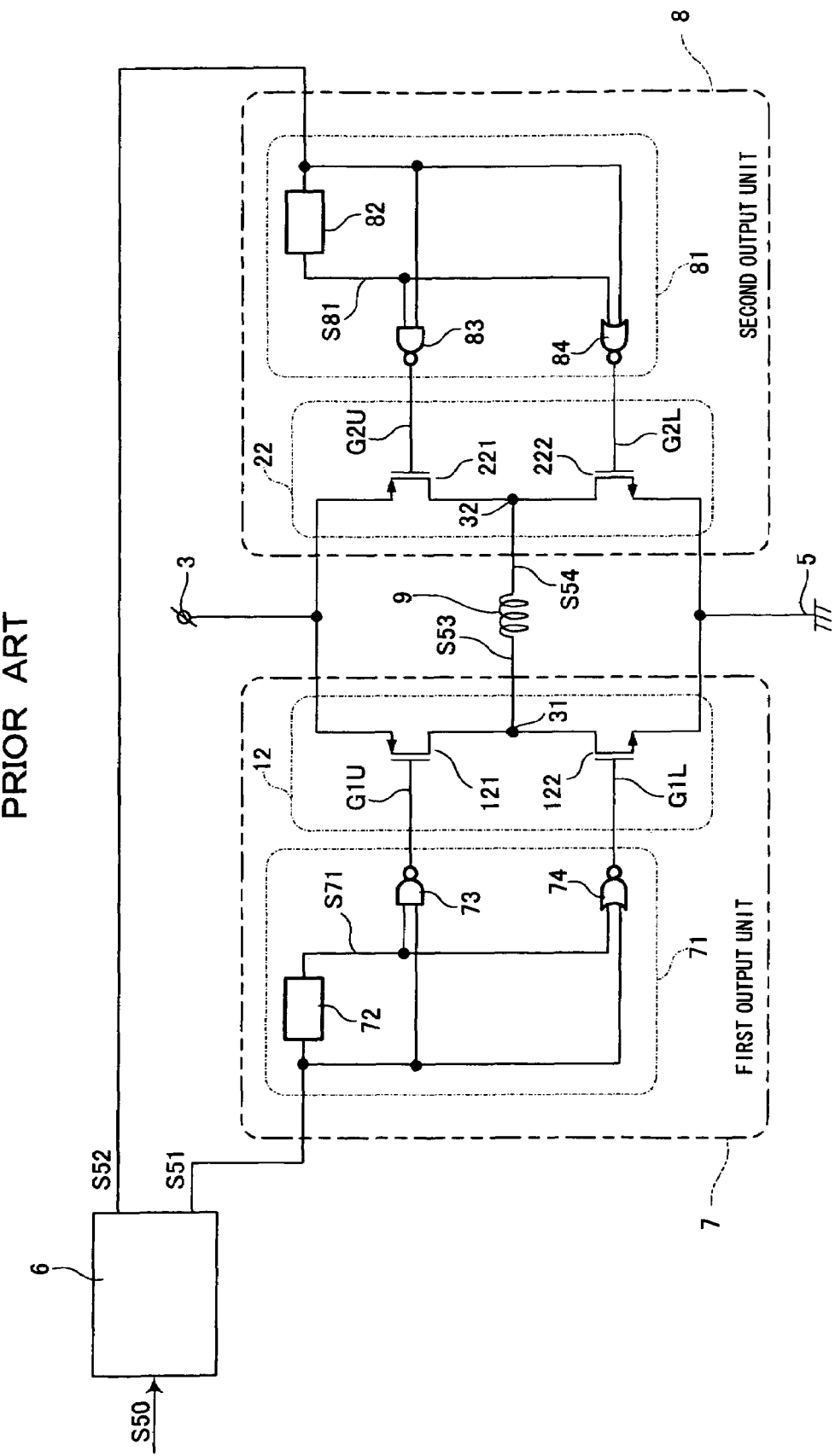
FIG. 8 is a circuit diagram showing the conventional example.
Figure 9:
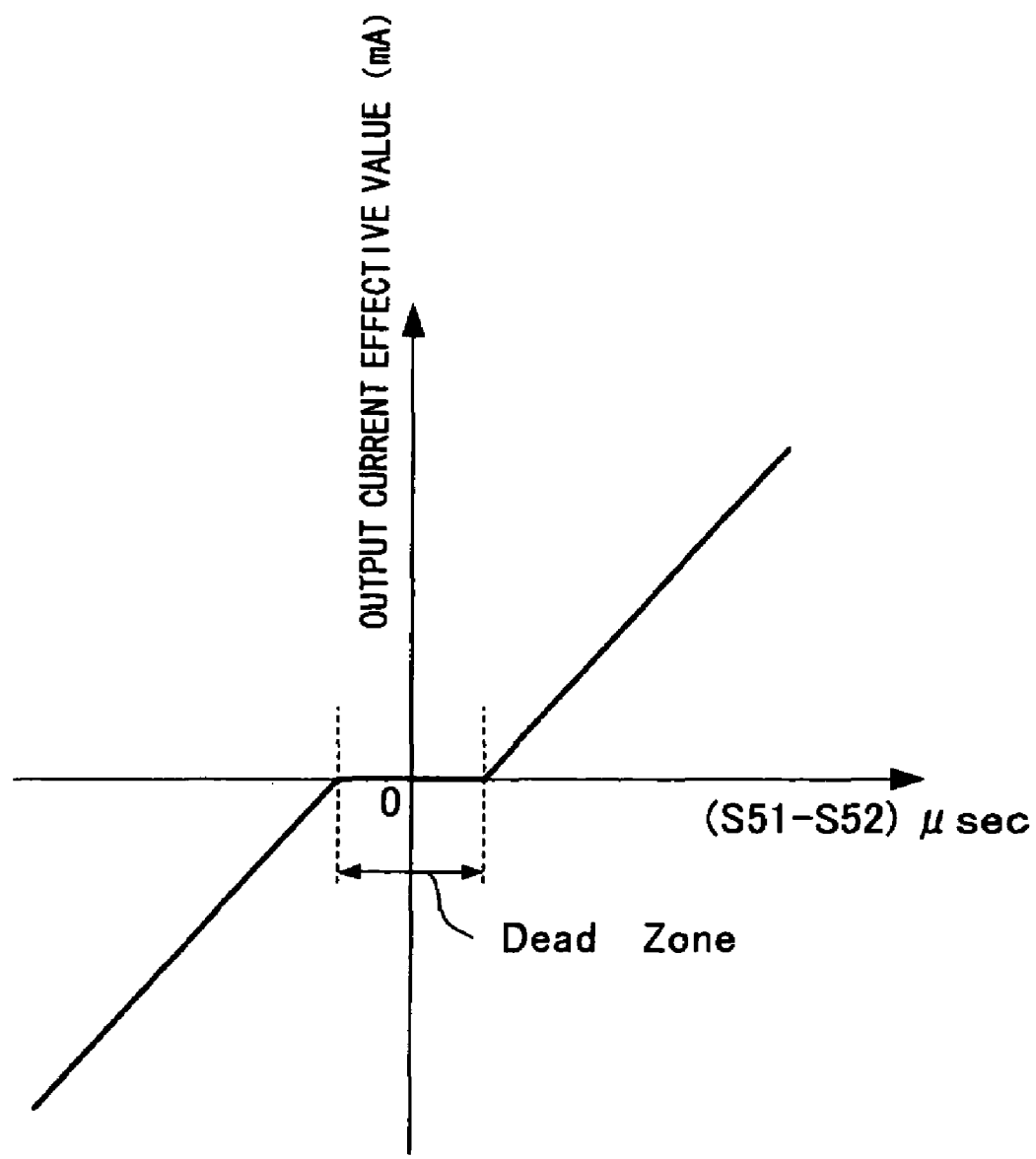
FIG. 9 is an explanatory drawing showing a dead zone and an output current effective value relative to a time difference of a conventional differential input PWM signal.
Figure 10:
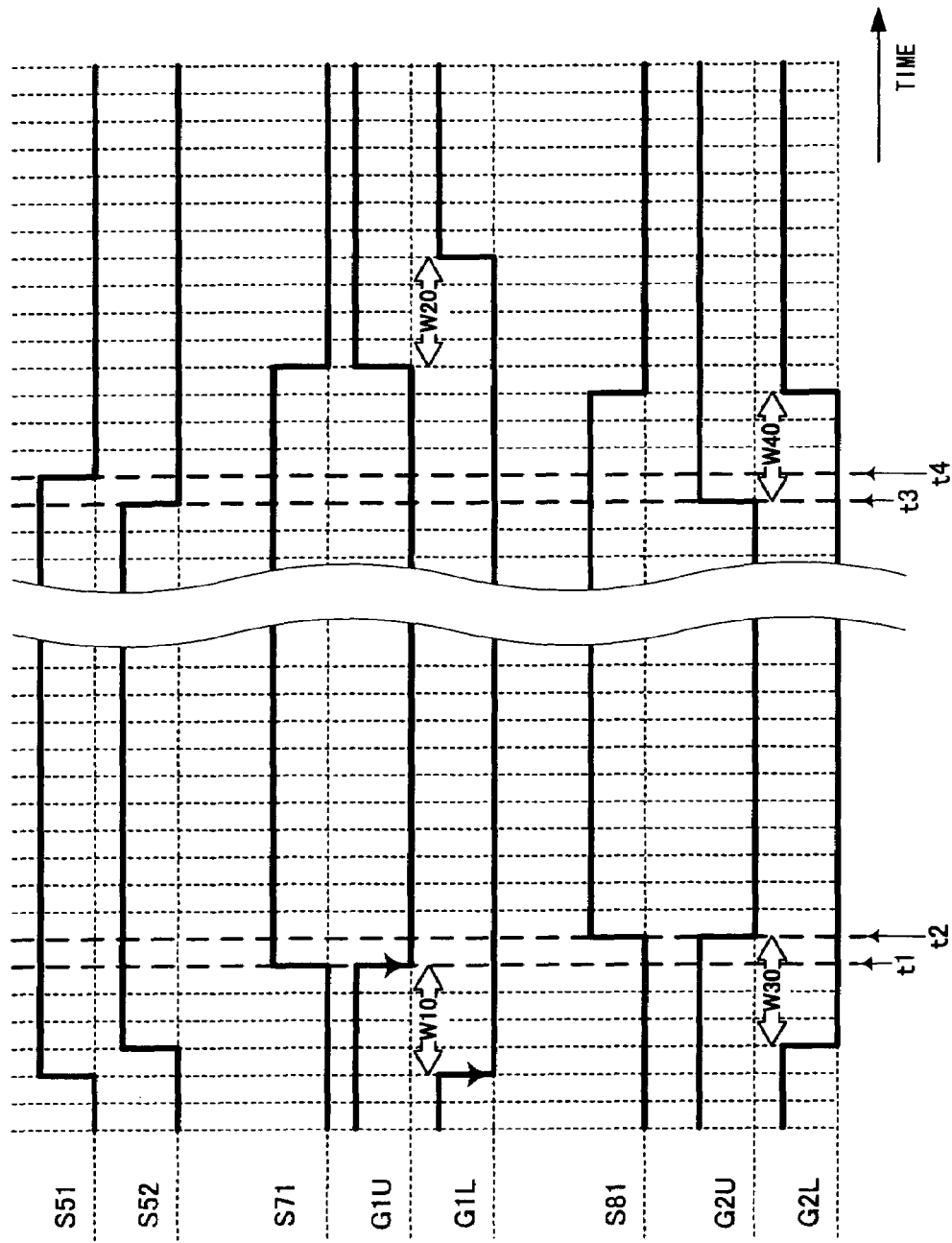
FIG. 10 is a timing chart of the conventional example.

Reversely, when the rising edge of the first PWM signal S51 comes behind the second PWM signal, the advanced edge decision signal S21 of "L" level is outputted from the advanced edge decision section 23 of the second output unit 8A as shown in FIG. 4, and the advanced edge decision signal S11 of "H" level is outputted, from the rising edge of the first PWM signal S51, from the advanced edge decision section 13 of the first output unit 7A. Thus the selector circuit 17 selects the reference signal S17 and applies the reference signal S17 as the gate signal G1L to the gate of the transistor 222. On the other hand, the selector circuit 18 selects the reference signal S24 and applies the reference signal S24 as the gate signal G2U to the gate of the transistor 221. In this way, current pulses in opposite directions are applied to the actuator 9 and thus a pulse width can be controlled without causing a time difference between the first PWM signal S51 and the second PWM signal S52 which make up a differential input PWM signal. With these operations, pulse width modulation can be performed according to a fluctuation in voltage in the positive direction and the negative direction relative to the zero level of the analog input signal S50 shown in FIG. 7.

Figure 5:
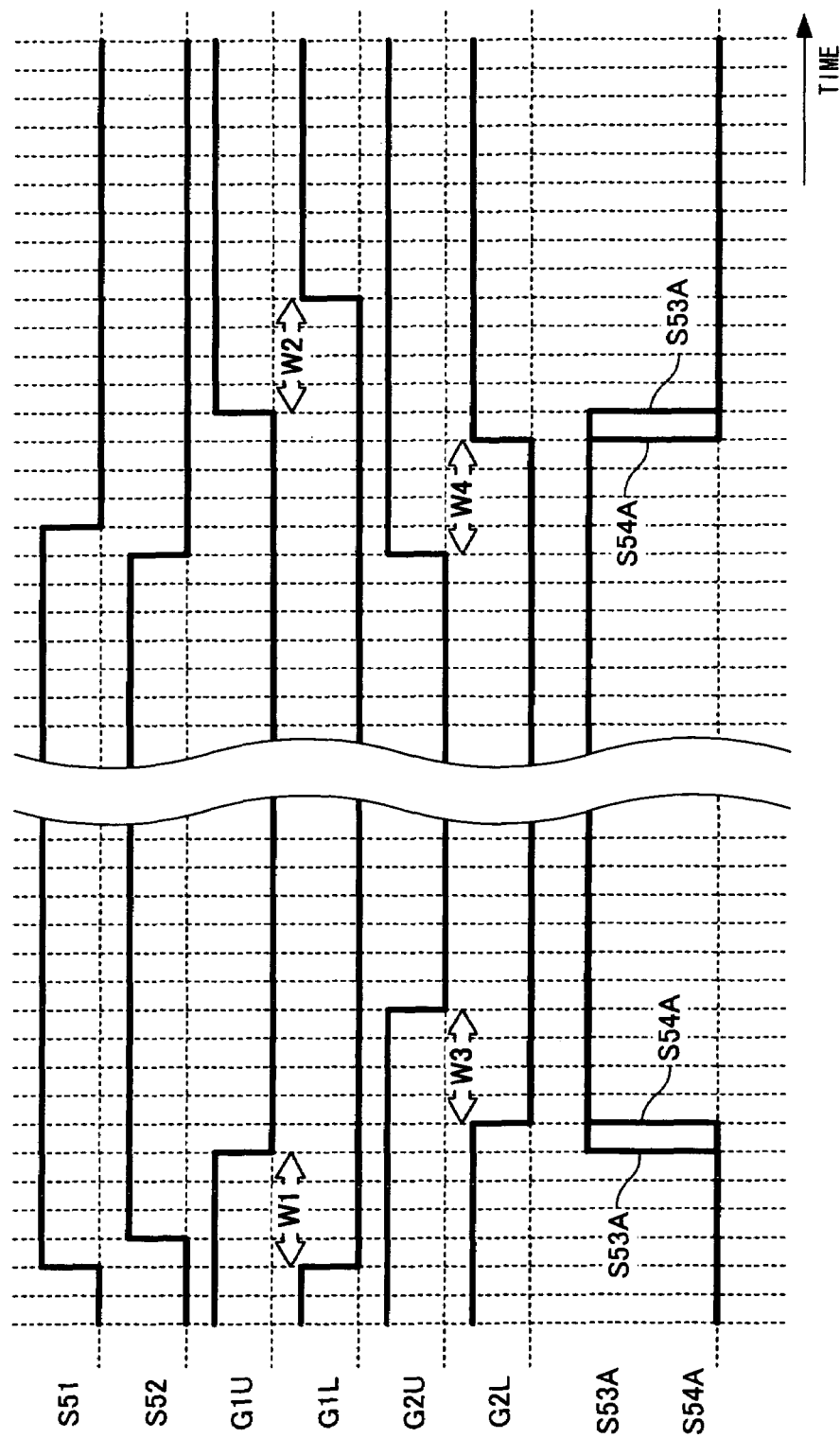
FIG. 5 is an explanatory drawing of a timing chart of (Embodiment 1)

A timing chart of FIG. 5 shows the first and second PWM signals S51 and S52, the gate signals G1U, G1L, G2U, and G2L to the first and second output stages 12 and 22, and the outputs S53A and S54A on the same time axis.

In the case where the second PWM signal S52 rises after the first PWM signal S51, the output voltage S53A is switched from "L" level to "H" level when the transistor 121 is turned on. At this point, the transistor 222 is kept turned on. And then, the transistor 222 is switched from on to off after the rising edge of the output voltage S53A, and the output voltage S54A is switched from "L" level to "H" level after the output voltage S53A. Hence, in a period from the time the output voltage S53A rises to the time the transistor 222 is switched from on to off, a thin current pulse is applied to the actuator 9 in a direction from the first output stage 12 to the second output stage 22. The pulse width of the thin current pulse corresponds to a time difference between the rising edges of the first and second PWM signals S51 and S52. In FIG. 5, the output voltage S54A rises concurrently with the falling edge of the gate signal G2L. This is because the transistors 221 and 222 are turned off (high impedance) in the dead time W3. The output voltage S54A becomes in phase with the output voltage S53A on the first output stage 12 through the actuator 9, so that such a voltage waveform is obtained.

Also in the case where the first PWM signal S51 falls after the second PWM signal S52, the output voltage S54A is switched from "H" level to "L" level when the gate signal G2L is switched from "L" level to "H" level and the transistor 222 is turned on. At this point, the transistor 121 is kept turned on. And then, the transistor 121 is switched from on to off after the falling edge of the output voltage S54A, and the output voltage S53A is switched from "H" level to "L" level after the output voltage S54A. Hence, in a period from the time the output voltage S54A falls to the time the transistor 121 is switched from on to off, a thin current pulse is applied to the actuator 9 in a direction from the first output stage 12 to the second output stage 22. The pulse width of the thin current pulse corresponds to a time difference between the falling edges of the first and second PWM signals S51 and S52.

When one of the PWM signals rises, the inputted one PWM signal is delayed at the detection of the other PWM signal at "H" level. Thus in the first and second timing pulse generating sections, the driving timing signal can be generated such that the dead times W1 and W2 of the first output stage and the dead times W3 and W4 of the second output stage 22 do not overlap each other.

It is thus possible to positively obtain an overlap of a period during which one of the output terminals is set at H (or L) and a period during which the other output terminal is set at L (or H), in order to reflect a small time difference of the differential input PWM signal on the two output signals. Therefore, even when a time difference of the differential input PWM signal is shorter than the dead time, a differential pulse precisely reflecting the time difference of the differential input PWM signal can be outputted as a PWM signal, minimizing the dead zone of the output current pulse. In this way, even when a time difference of the differential input PWM signal is smaller than the dead time, achieving precise response of the output current pulse.

Embodiment 2

In the foregoing embodiment, the decisions of the advanced edge decision sections 13 and 23 are made by detections on the rising edge of the signal. The decision may be limited to detection on the falling edge of the signal in practical terms.

In other words, the flip-flop 110 is fed with the inverted signal of the second PWM signal S52 as data input (D) and the inverted signal of the first PWM signal S51 as a clock. The state of the second PWM signal S52 at the falling edge of the first PWM signal S51 can be detected by deciding whether the second PWM signal S52 has already fallen or not at the falling edge of the first PWM signal S51. The flip-flop 210 is fed with the inverted signal of the first PWM signal S51 as data input (D) and the inverted signal of the second PWM signal S52 as a clock by reading the data input, so that the state of the first PWM signal S51 at the falling edge of the second PWM signal S52 can be detected by deciding whether the first PWM signal S51 has already fallen or not at the falling edge of the second PWM signal S52.

In this case, when one of the PWM signals rises, the inputted one PWM signal is delayed at the detection of the other PWM signal at "L" level. Thus the driving timing signal can be generated such that the dead time of the first output stage and the dead time of the second output stage 22 do not overlap each other. It is thus possible to positively obtain an overlap of a period during which one of the output terminals is set at H (or L) and a period during which the other output terminal is set at "L" (or "H" level), so that a thin differential pulse can be outputted as a PWM signal.

According to an ordinary method for PWM motor drive, a dead time circuit is provided to prevent passage of flow-through current. Thus in this case, it is not possible to respond to an input pulse with a smaller pulse width than a dead time generated by the dead time circuit. With this configuration, even when a time difference of the differential input PWM signal is smaller than the dead time, it is possible to output a differential pulse precisely reflecting a time difference of the differential input PWM signal, minimizing a dead zone. In this way, even when a differential pulse with a small pulse width is outputted as a PWM signal, an apparatus for motor drive of the present embodiment can achieve precise response.

In these embodiments, the transistors 121 and 221 acting as the switching elements of the first and second output stages 12 and 22 are P-channel type transistors and the transistors 122 and 222 are N-channel transistors. Effective operations can be obtained by properly reversing the logics of the input signals to the gates of the transistors regardless of whether the conductivity types of the transistors 121, 122, 221 and 222 are N channel or P channel. The transistor is not limited to a MOS transistor. A BJT (Bipolar Junction Transistor), an IGBT (Insulated Gate Bipolar Transistor), and other FETs may be used. All these minor changes are included in the gist of the present invention.

When a load is driven by pulse-width modulation, the apparatus for motor drive of the present invention can drive the load with a pulse width corresponding to a time difference between the two output pulses even though the time difference is small, thereby eliminating a dead zone of output response. Thus the present invention is useful for an apparatus for motor drive of pulse-width modulation.

What is claimed is:

1. A method for driving a PWM motor drive, wherein a load is connected to output terminals of first and second output stage circuits, respectively, said output stage circuits driven by first and second PWM signals, respectively, each having a high level and a low level, from a PWM generating section, the method comprising:
   detecting a signal level of a first PWM signal;
   determining whether one of first and second PWM signals is at low level or high level after the other of the first and second PWM signals is switched between a low level and a high level;
   powering the load only when the first PWM signal and the second PWM signal are at different levels from each other;
   providing dead time when two switching elements in series are both turned off, said switching elements constituting first and second output stage circuits, and thus operating the first and second output stage circuits; and
   driving the load such that the first and second output stage circuits do not have dead time simultaneously.

2. An apparatus for PWM drive, comprising:
   a PWM signal generating section for generating first and second PWM signals each having a pulse width determined by an analog input signal;
   a bridge circuit comprising first and second output stages each including two switching elements connected in series, the bridge circuit including a load connected between output terminals of the output stages;
   a first advanced edge decision section for deciding whether the first or second PWM signal is switched first and outputting a first advanced edge decision signal;
   a first timing pulse generating section for receiving the first PWM signal and the first advanced edge decision signal as input signals, and for having a dead time during which the switching elements connected in series and comprising the first output stage are simultaneously turned off, and for generating first and second driving timing signals causing no overlapping dead time between the first and second output stages;
   a second advanced edge decision section for deciding whether the first or second PWM signal is switched first and outputting a second advanced edge decision signal; and a second timing pulse generating section for receiving the second PWM signal and the second advanced edge decision signal as input signals, and for having a dead time during which the switching elements connected in series and comprising the second output stage are simultaneously turned off, and for generating third and fourth driving timing signals causing no overlapping dead time between the first and second output stages.

3. The apparatus for PWM drive according to claim 2, wherein the first timing pulse generating section comprises:

a first delay pattern generating section for generating a plurality of delay signals obtained by delaying the first PWM signal by different predetermined times, a combination of the delay signals, and PWM signals inverted from the delay signals; and a first selector for selecting, based on the first advanced edge decision signal, one of the plurality of PWM signals outputted from the first delay pattern generating section and outputting the selected signal as the driving timing signal to the first output stage; and the second timing pulse generating section comprises:

a second delay pattern generating section for generating a plurality of delay signals obtained by delaying the second PWM signal by different predetermined times, a combination of the delay signals, and PWM signals inverted from the delay signals; and a second selector for selecting, based on the second advanced edge decision signal, one of the plurality of PWM signals outputted from the second delay pattern generating section and outputting the selected signal as the driving timing signal to the second output stage.

4. The apparatus for PWM drive according to claim 3, wherein the first delay pattern generating section comprises:

a first delay circuit for outputting the first delay signal obtained by delaying the first PWM signal;

a second delay circuit for outputting the second delay signal obtained by delaying the first delay signal;

a first inverter for outputting the signals inverted from the first delay signal;

a first NAND gate having an input connected to the first PWM signal and the second delay signal; and a first NOR gate having an input connected to the first PWM signal and the second delay signal;

the first selector comprises:

a first selector circuit for selecting one of the output signal of the first inverter and an output signal of the first NAND gate based on the first advanced edge decision signal and outputting the driving timing signal to a gate of one of the two switching elements making up the half-bridge circuit acting as the first output stage; and a second selector circuit for selecting one of the output signal of the first inverter and an output signal of the first NOR gate based on the first advanced edge decision signal and outputting the driving timing signal to a gate of the other switching element making up the half-bridge circuit acting as the first output stage;

the second delay pattern generating section comprises:

a third delay circuit for outputting the third delay signal obtained by delaying the second PWM signal;

a fourth delay circuit for outputting the fourth delay signal obtained by delaying the third delay signal;

a second inverter for outputting the signals inverted from the third delay signal;

a second NAND gate having an input connected to the second PWM signal and the fourth delay signal; and a second NOR gate having an input connected to the second PWM signal and the fourth delay signal; and the second selector comprises:

a third selector circuit for selecting one of the output signal of the second inverter and the output signal of the second NAND gate based on the second advanced edge decision signal and outputting the driving timing signal to the gate of one of the two switching elements making up the half-bridge circuit acting as the second output stage; and a fourth selector circuit for selecting one of the output signal of the second inverter and the output signal of the second NOR gate based on the second advanced edge decision signal and outputting the driving timing signal to the gate of the other switching element making up the half-bridge circuit acting as the second output stage.

5. The apparatus for PWM drive according to claim 2, wherein the load is an actuator.

* * * * *